March 13, 1956  J. L. SLONNEGER  2,738,397
TEMPERATURE RESPONSIVE CONTROL DEVICE
Filed Oct. 29, 1954
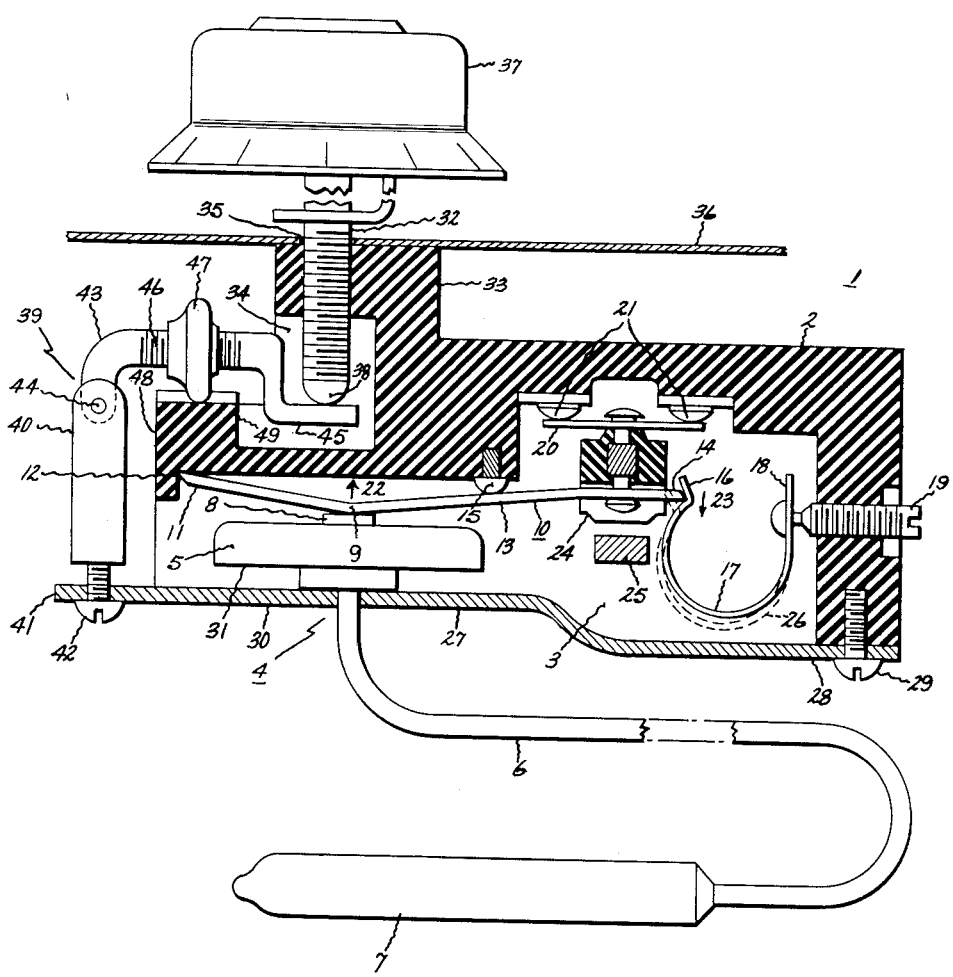
Inventor:
John L. Slonneger,
by *[signature]*
His Attorney.

United States Patent Office 2,738,397
Patented Mar. 13, 1956

2,738,397

TEMPERATURE RESPONSIVE CONTROL DEVICE

John L. Slonneger, Morrison, Ill., assignor to General Electric Company, a corporation of New York Application October 29, 1954, Serial No. 465,613

11 Claims. (Cl. 200—140)

This invention relates to temperature responsive control devices and more particularly to devices commonly referred to as thermostats which are arranged to actuate contacts in response to a selected temperature.

Thermostats are used to control many heating and cooling devices, such as the ovens of domestic ranges. In the case of oven thermostats, the thermostat must be accessible for manual selection of the desired operating temperature, but must sense the temperature in remote location, i. e., the interior of the oven. Thermostats for such applications typically include as an actuating element and expansible bellows or diaphragm connected to a gas filled capillary tube which terminates in a bulb positioned in the oven. The bellows or diaphragm is conventionally connected by suitable linkages to actuate the thermostat contacts and is also opposed by a selectively variable force in order to set the temperature at which the contacts will be actuated.

Oven thermostats may be constructed to have a predetermined differential, i. e., the difference between the temperature at which the contacts close and the temperature at which they open. In the alternative, they may be provided with contacts which make and break slowly with the thermal delay of the system providing the differential. They must in any even be accurately calibrated, i. e., adjusted so that the bellows or diaphragm will actuate the contacts at the desired temperatures in accordance with the markings on the dial. In the past oven thermostats have been provided with means for adjusting differential and also means for adjusting the opposing force on the bellows or diaphragm to provide for operation of the contacts at the temperature called for in a fixed position of the temperature selecting knob or dial. Oven thermostats however are required to control temperatures over a substantial range and it is therefore essential that the bellows or diaphragm actuate the contacts at the temperature selected in any position of the temperature selecting knob or dial. In the past, this requirement has necessitated close manufacturing tolerances and has caused an unduly high percentage of rejections in test.

It is therefore desirable to provide a thermostat having not only the adjustments previously provided, but also an adjustment to insure accurate calibration of the thermostat over its entire range of operation thereby permitting more liberal manufacturing tolerances and reducing rejections in test.

It is therefore an object of this invention to provide an improved temperature responsive control device incorporating the desirable features set forth above.

Further objects and advantages of this invention will become apparent by reference to the following description and the accompanying drawing, and the features of novelty which characterize this invention will be pointed out with particularity in the claims annexed to and forming a part of this specification.

In accordance with the broadest aspects of this invention, a temperature response control device is provided having means adapted to sense a remote temperature and operable in response to variations in the temperature. An operating lever is provided adapted to be moved from a first position to a second position by the temperature sensing means and contacts are provided adapted to be actuated by the operating lever. Resilient means are provided opposing movement of the operating lever to its second position and means are provided for adjustably preloading the temperature sensing member. A movable member is provided adapted to be connected to a temperature selecting handle and an adjusting lever connects the movable member and the preloading means thereby selectively to adjust the preloading of the temperature sensing means and the operating temperature of the device. In order to provide for accurate calibration of the device so that the contacts will be actuated at the temperature selected in any position of the temperature selecting handle, pivot means are provided for the adjustment lever and are selectively movable therealong in order to vary the fulcrum point thereof. This adjustable fulcrum makes it possible to correct for imperfections in the component parts and for the variances in deflection of the temperature sensing means per degree of temperature.

The single figure of the drawing is a side elevational view, partly in section, showing the improved temperature responsive control device of this invention.

Referring now to the drawing, there is shown a thermostat, generally identified as 1, particularly adapted for controlling the temperature of the oven of a domestic range. Thermostat 1 includes a housing member 2, preferably formed of molded insulating material, and having a cavity 3 formed therein. Temperature sensing means 4 are provided comprising an expansible element 5 positioned within cavity 3 of housing member 2, and a capillary tube 6 having one end comunicating with the expansible element 5 and its other end terminating in a bulb 7. Capillary tube 6 and bulb 7 are filled with an expansible gas or fluid and bulb 7 is adapted to be positioned within the oven to be controlled. Expansible element 5 may be either a diaphragm or a bellows. It will be readily understood that as the temperature in the oven increases, the liquid or gas in bulb 7 expands thus creating additional pressure within expansible element 5 and causing it to move, the degree of movement being proportional to an increase in temperature.

The upper side 8 of expansible element 5 engages bowed portion 9 of operating lever 10. One end 11 of operating lever 10 is pivoted on housing member 2, as at 12 and a portion 13 thereof intermediate pivoted end 11 and free end 14 is in engagement with an abutting pivot 15 seated in housing member 2. Free end 14 of operating lever 10 is engaged by one end 16 of a non-overcenter toggle spring 17, which in turn has its other end 18 pivoted to housing member 2 by means of adjusting screw 19. A movable contact bridging element 20 is secured to operating lever 10 adjacent its free end 14 and cooperates with stationary contacts 21.

It will now be seen that expansion of expansionable member 5 in response to an increase in temperature sensed by bulb 7 tends to move bowed portion 9 of operating lever 10 in the direction shown by the arrow 22, and since operating lever 10 is formed of resilient material such as spring steel, this tends to move the free end 14 in the direction shown by the arrow 23. This movement of the free end 14 of operating lever 10 is however opposed by the force applied by non-overcentered toggle spring 17 and the force exerted by virtue of the bowed configuration of operating lever 10. It is thus seen that when the upward force exerted by expansible member 5 in response to increased temperature sensed by bulb 7 exceeds the opposing force exerted by operating lever 10 and non-overcentered toggle springs 17, the bowed portion 9 of operating lever 10 will be deflected and the free end 14 of operating lever 10 will move from a first position, as shown in drawing, to a second position with contact mounting assembly 24 engaging a stop portion 25 and removable contact bridging 20 separated from stationary contacts 21. Stationary contacts 21 may be connected in the circuit of the heating elements in the oven and thus when the free end 14 of operating lever 10 moves from its first position to its second position, the circuit of the heating elements is broken thus permitting the oven to cool down. This cooling of the oven is sensed by bulb 7 resulting in a decrease in the pressure exerted by expansible element 5. When the upward pressure exerted by expansible element 5 on the bowed portion 9 of operating lever 10 falls below the downward force exerted by operating lever 10 and non-evercentered toggle spring 17, the toggle spring 17 will move the free end 14 of operating lever 10 from its second position back to the first position as shown in the drawing thus causing movable contact bridging element 20 to connect stationary contacts 21 thereby to reenergize the heating elements in the oven. It will be readily understood that the non-overcentered spring 17 exerts a greater upward force in the position shown in the drawing than it does in its deflected position, as shown in dotted lines 26 thus providing the differential between the upper temperature at which expansible element 5 overcomes the force exerted by operating lever 10 and non-overcentered toggle spring 17 to open contacts 21, and the lower temperature at which operating lever 10 and toggle spring 17 will overcome the force exerted by expansible element 5 to reclose the contacts.

In order to provide a backing for expansible element 5, and also to adjustably preload expansible element 5 in order to select the temperature at which contacts 21 will be open, a preloading lever 27 is provided having its end 28 secured to housing member 2, as by screw 29, and having a portion 30 engaging the bottom side 31 of expansible element 5. It is thus seen that by means of positioning preloading lever 27, an initial upward force at room ambient of any desired amount can be applied to expansible member 5. The deflection of the expansible member 5 required to deflect operating lever 10 and to move toggle spring 17 to its second position 26 will be supplied by pressure from bulb 7. Thus, if preloading lever 27 is only applying a small degree of force to expansible member 5 when bulb 7 is at room ambient, a larger amount of deflection of expansible member 5 must be supplied by expansion of the liquid in bulb 7 to cause non-overcentered spring 17 to move to its second position 26 opening contacts 21 at a higher temperature than if a high degree of initial preloading at room ambient were supplied by moving up preloading lever 27.

In order to adjustably select the temperature at which contacts 21 will open, the arrangement now to be described is provided. A screw member 32 is threadedly mounted in portion 33 of housing member 2 and extends into a cavity 34. Threaded member 32 extends through an opening 35 in a plate member 36, which may be a portion of the range with which thermostat 1 is used, and to which housing member 2 may be secured. Threaded member 32 may have a temperature selecting handle, knob or dial 37 secured thereto and it will be readily seen that rotation of knob 37 causes the end 38 of threaded member 32 to move axially in cavity 34. Connecting screw member 32 and preloading lever 27 is an adjusting lever 39. Adjusting lever 39 has a first portion 40 connected to end 41 of preloading lever 27 by adjusting screw 42, and a second portion 43 pivotably connected to first portion 40, as at 44, and having a flattened end portion 45 engaging end 38 of screw member 32. Portion 43 of adjusting lever 39 is threaded, as at 46 and a pivot member 47 is threadedly mounted thereon. Pivot member 47 has its outer periphery seated in a mating groove 48 in portion 49 of housing member 2.

It will now be seen that as temperature selecting knob 37 is turned in one direction, threaded member 32 will move downwardly as viewed in the drawing, thus moving end 45 of portion 43 of adjusting lever 39 and pivoting portion 43 about pivot member 47 to move portion 40 upwardly thus moving preloading lever 27 upwardly to apply additional preloading force on expansible member 5. Conversely of course, as temperature selecting knob 37 moves in the opposite direction, threaded member 32 will move upwardly as viewed in the drawing thus causing portion 43 of adjusting lever 39 to pivot about pivot member 47 thereby moving portion 40 downwardly and causing preloading lever 27 to apply less preloading force on expansible number 5. It is thus seen that temperature selecting knob 37 is used to select the degree of preloading applied to expansible member 5 and thus the temperature at which contacts 21 will open.

It will be seen that the adjusting screw 19 determines the temperature differential of the device. As screw 19 is moved to the left as viewed in the drawing, end 18 of non-overcentered toggle spring 17 is also moved to the left thus applying a greater upward force on free end 14 of operating lever 10 to oppose the force exerted by expansible member 5. Conversely, moving adjusting screw 19 to the right as viewed in the drawing, moves end 18 of spring 17 to the right decreasing the upward force applied by spring 17 on free end 14 of operating lever 10. Since the force which non-overcentered toggle spring 17 exerts in its second position 26 is substantially the same regardless of the position of adjusting screw 19, because the toggle is approximately on dead center when in the second position, spring 17 will restore operating lever 10 to the position in which contacts 21 are opposed in response to the same decrease in temperature sensed by bulb 7, however, the increase in temperature required to overcome the force exerted by non-overcentered toggle spring 17 is determined by the adjusting screw 19 thus providing for adjustment of the temperature differential of the device.

It will also be seen that for any given position of knob 37, the degree of force applied by preloading lever 27 to expansible member 5 can be adjusted by screw 42. It is thus seen, that with temperature selecting knob 37 set for a temperature of 300° for example, bulb 7 can be placed in a 300° ambient and screw 42 adjusted until spring 17 moves to its second position 26 to open contacts 21.

In order to insure however that temperature at which expansible member 5 will overcome spring 17 to open contacts 21 corresponds to any temperature called for by temperature selecting knob 37, pivot member 47 is movable along portion 43 of adjusting lever 39 by means of threads 46, thus varying the fulcrum point of adjusting lever 39. Moving pivot member 47 will change the lever ratio between the preloading lever 27 and threaded member 32, thus making it possible to correct for imperfections of the components such as lead of the threaded member 32, or the amount of deflection of expansible member 5 per degree of change in the temperature to which bulb 7 is exposed. By virtue of this additional adjustment to compensate for imperfections and variations of the components of the thermostat 1, parts with wider tolerances than those previously used can be utilized while at the same time obtaining closer temperature settings with respect to temperatures indicated on the temperature selecting knob 37. It will be readily apparent that the more liberal tolerances permitted by this construction in expansible member 5, the threaded member 32 and other components will substantially reduce the overall cost of these thermostats.

It will now be readily apparent that I have provided an improved temperature responsive control device which provides not only adjustment of the temperature differential and actual temperature for a fixed knob position, but also an adjustment to insure accurate calibration over the entire temperature range of the device so that the contacts 21 will open at the temperature set by the temperature selecting knob 37.

While I have shown and described a particular embodiment of this invention, further modifications and improvements will occur to those skilled in the art. I desire that it be understood therefor that this invention is not limited to the form shown and I intend in the appended claims to cover all modifications which do not depart from the spirit and scope of this invention.

What I claim as new and desire to secure by Letters Patent of the United States is:

1. A temperature responsive control device comprising means adapted to sense a remote temperature and operable in response to variations thereof, an operating lever adapted to be moved from a first position to a second position by said temperature sensing means, contacts adapted to be actuated by said operating lever, resilient means opposing movement of said operating lever to said second position thereof, means for adjustably preloading said temperature sensing means, a movable member adapted to be connected to a temperature selecting handle, an adjusting lever connecting said movable member and said preloading means thereby selectively to adjust the preloading of said temperature sensing means and the operating temperature of said device, and pivot means for said adjusting lever, and means to selectively vary the lever ratio of said adjusting lever for calibrating said device.

2. A temperature responsive control device comprising means adapted to sense a remote temperature and operable in response to variations thereof, an operating lever engaging one side of said temperature responsive means and adapted to be moved from a first position to a second position thereby, contacts adapted to be actuated by said operating lever, resilient means opposing movement of said operating lever to said second position thereof, means for adjustably preloading said temperature sensing means and engaging the other side thereof, a movable member adapted to be connected to a temperature selecting handle, an adjusting lever connecting said movable member and said preloading means thereby selectively to adjust the preloading of said temperature sensing means and the operating temperature of said device, and pivot means for said adjusting lever, said pivot means being selectively movable along said adjusting lever thereby to vary the lever ratio thereof for calibrating said device.

3. A temperature responsive control device comprising a housing member, means adapted to sense a remote temperature and operable in response in variations thereof, an operating lever having one end pivoted to said housing and having a portion remote from said pivoted end engaging one side of said temperature sensing means whereby the free end of said operating lever is moved from a first position to a second position in response of operation of said temperature sensing means, contacts adapted to be actuated by said operating lever, spring means engaging said free end of operating lever and opposing movement of said free end thereof to said second position thereof, a preloading lever engaging the other side of said temperature sensing means for adjustably preloading the same, a movable member adapted to be connected to a temperature selecting handle, an adjusting lever connecting said movable member and said preloading lever thereby selectively to adjust the preloading of said temperature sensing means and the operating temperature of said device, and pivot means on said adjusting lever and engaging said housing member, said pivot means being selectively movable along said adjusting lever thereby to vary the lever ratio thereof for calibrating said device.

4. A temperature responsive control device comprising a housing member, means adapted to sense a remote temperature and operable in response to variations thereof, an operating lever having one end pivoted to said housing member and having a portion remote from said pivoted end engaging one side of said temperature sensing means whereby the free end of said operating lever is moved from a first position to a second position in response to operation of said temperature sensing means, contacts adapted to be actuated by said operating lever, spring means engaging said free end of said operating lever and opposing movement of the same to said second position thereof, a preloading lever having one end secured to said housing member and having a portion remote from said one end engaging the other side of said temperature sensing means for adjustably preloading the same, a movable member adapted to be connected to a temperature selecting handle, and adjusting lever connecting the other end of said preloading lever and said movable member thereby selectively to adjust preloading of said temperature sensing means and the operating temperature of said device, and pivot means on said adjusting lever and engaging said housing member, said pivot means being selectively movable along said adjusting lever thereby to vary the lever ratio thereof for calibrating said device.

5. A temperature responsive control device comprising a housing member, means adapted to sense a remote temperature and operable in response to variations thereof, an operating lever having one end pivoted to said housing member and having a portion remote from said pivoted end engaging one side of said temperature sensing means whereby the free end of said operating lever is moved from a first position to a second position in response to operation of said temperature sensing means, contacts on said operating lever adjacent said free end thereof, a non-overcenter toggle spring having one end engaging said free end of said operating lever and its other end secured to said housing member and opposing movement of said free end of said operating lever to said second position thereof, a preloading lever having one end secured to said housing member and having a portion remote from said one end engaging the other side of said temperature sensing means for adjustably preloading the same, a movable member adapted to be connected to temperature selecting handle, an adjusting lever connecting the other end of said preloading lever and said movable member thereby selectively to adjust preloading of said temperature sensing means and the operating temperature of said device, and pivot means on said adjusting lever and engaging said housing member, said pivot means being selectively movable along said adjusting lever thereby to vary the lever ratio thereof for calibrating said device.

6. A temperature responsive control device comprising a housing member, means adapted to sense a remote temperature and operable in response to variations thereof, an operating lever formed of resilient material having one end pivoted to said housing member, means on said housing member abutting said operating lever at a point remote from said pivoted end, the portion of said operating lever intermediate said pivoted end and said abutting means being longitudinally bowed, said bowed portion of said operating lever engaging one side of said temperature sensing means whereby the free end of said operating lever is moved from a first position to a second position in response to operation of said temperature sensing means, contacts on said operating lever adjacent said free end thereof, a non-overcentered toggle spring having one end engaging said free end of said operating lever and its other end secured to said housing member and opposing movement of said free end of said operating lever to said second position thereof, a preloading lever having one end secured to said housing member and having a portion remote from said one end engaging the other side of said temperature sensing means for adjustably preloading the same, a movable member adapted to be connected to a temperature selecting handle, an adjusting lever connecting the other end of said preloading lever and said movable member thereby selectively to adjust the preloading of said temperature sensing means and the operating temperature of said device, and pivot means on said adjusting lever and engaging said housing member, said pivot means being selectively movable along said adjusting lever thereby to vary the lever ratio thereof for calibrating said device.

7. A temperature responsive control device comprising a housing member, means adapted to sense a remote temperature and operable in response to variations thereof, an operating lever having one end pivoted to said housing member and having a portion remote from said pivoted end engaging one side of said temperature sensing means whereby the free end of said operating lever is moved from a first position to a second position in response to operation in said temperature sensing means, contacts adapted to be actuated by said operating lever, spring means engaging said free end of said operating lever and opposing movement of the same to said second position, a preloading lever having one end secured to said housing member and having a portion remote from said one end engaging the other side of said temperature sensing means for adjustably preloading the same, a screw member threadingly engaging said housing member and adapted to be connected to a temperature selecting handle and movable axially in response to rotation of said handle, an adjusting lever having a first portion engaging the other end of said preloading lever and a second portion pivotably connected to said first portion and engaging the end of said screw member thereby selectively to adjust the preloading of said temperature sensing means and the operating temperature of said device, and a pivot member on one of said portions of said adjusting lever and engaging said housing member, said pivot member being selectively movable along said portion of said adjusting lever thereby to vary the lever ratio of said adjusting lever for calibrating said device.

8. A temperature responsive control device comprising a housing member, means adapted to sense a remote temperature and operable in response to variations thereof, an operating lever having one end pivoted to said housing member and having a portion remote from said pivoted end engaging one side of said temperature sensing means whereby the free end of said operating lever is moved from a first position to second position in response to operation of said temperature sensing means, spring means engaging said free end of said operating lever and opposing movement of the same to said second position, a preloading lever having one end secured to said housing member and having a portion remote from said one end engaging the other side of said temperature sensing means for adjustably preloading the same, a screw member threadingly engaging said housing and adapted to be connected to a temperature selecting handle and movable axially in response to rotation of said handle, an adjusting lever having a first portion engaging the other end of said preloading lever and a second portion pivotably connected to said first portion and engaging the end of said screw member thereby selectively to adjust the preloading of said temperature sensing means and the operating temperature of said device, said second portion of said adjusting lever having a threaded section, and a pivot member threadingly arranged on said threaded section and having its periphery seated in a groove formed in said housing member thereby to vary the lever ratio of said adjusting lever for calibrating said device.

9. A temperature responsive control device comprising a housing member, means adapted to sense a remote temperature and operable in response to variations thereof, an operating lever formed of resilient material having one end pivoted to said housing member, means on said housing member abutting said operating lever at a point remote from said pivoted end, the portion of said operating lever intermediate said pivoted end and said abutting means being longitudinally bowed, said bowed portion of said operating lever engaging one side of said temperature sensing means whereby the free end of said operating lever is moved from a first position to a second position in response to operation of said temperature sensing means, contacts on said operating lever adjacent said free end thereof, a non-overcenter toggle spring having one end engaging said free end of said operating lever and its other end secured to said housing and opposing movement of said free end of said operating lever to said second position thereof, a preloading lever having one end secured to said housing member and having a portion remote from said one end engaging the other side of said temperature sensing means for adjustably preloading the same, a screw member threadingly engaging said housing member adapted to be connected to a temperature selecting handle and movable axially in response to rotation of said handle, an adjusting lever having a first portion engaging the other end of said preloading lever and a second portion pivotally connected to said first portion and engaging the end of said screw member thereby selectively to adjust the preloading of said temperature sensing means and the operating temperature of said device, and a pivot member on said second portion of said adjusting lever and engaging said housing member, said pivot member being selectively movable along said second portion of said adjusting lever thereby to vary the lever ratio of said adjusting lever for calibrating said device.

10. A temperature responsive control device comprising a housing member, a means adapted to sense a remote temperature and operable in response to variations thereof, an operating lever formed of resilient material having one end pivoted to said housing, means on said housing abutting said operating lever at a point remote from said pivoted end, the portion of said operating lever intermediate said pivoted end and said abutting ends being longitudinally bowed, said bowed portion of said operating lever engaging one side of said temperature sensing means whereby the free end of said operating lever is moved from a first position to a second position in response to operation of said temperature sensing means, contacts on said operating lever adjacent said free end thereof, a non-overcenter toggle spring having one end engaging said free end of said operating lever and its other end secured to said housing member and opposing movement of said free end of said operating lever to said second position thereof, a preloading lever having one end secured to said housing member and having a portion remote from said one end engaging the other side of said temperature sensing means, a screw member threadingly engaging said housing member and adapted to be connected to a temperature selecting handle and movable axially in response to rotation of said handle, an adjusting lever having a first portion engaging the other end of said preloading lever and a second pivotally connected to said first portion and engaging the end of said screw member thereby selectively to adjust the preloading of said temperature sensing means and the operating temperature of said device, said second portion of said adjusting lever having a threaded section, and a pivot member threadedly arranged on said threaded section and having its periphery seated in a groove formed in said housing member thereby to vary the lever ratio of said adjusting lever for calibrating said device.

11. A temperature responsive control device comprising a housing member, means adapted to sense a remote temperature and operable in response to variations thereof, an operating lever formed of resilient material having one end pivoted to said housing member, means on said housing member abutting said operating lever at a point remote from said pivoted end, the portion of said operating lever intermediate said pivoted end and said abutting means being longitudinally bowed, said bowed portion of said operating lever engaging one side of said temperature sensing means whereby the free end of said operating lever is moved from a first position to a second position in response to operating of said temperature sensing means, contacts on said operating lever adjacent said free end thereof, a non-overcenter toggle spring having one end engaging said free end of said operating lever and its other end secured to said housing, means for adjusting the force applied by said spring thereby to adjust the differential of said device, a preloading lever having one end secured to said housing member and having a portion remote from said one end engaging the other side of said temperature sensing means for adjustably preloading the same, a screw member threadingly engaging said housing and adapted to be connected to a temperature selecting handle and movable axially in response to rotation of said handle, an adjusting lever having a first portion engaging the free end of said preloading lever and a second portion pivotally connecting to said first portion and engaging the end of said screw member thereby selectively to adjust the preloading of said temperature sensing means and the operating temperature of said device, means for adjusting the force applied to said temperature sensing means by said preloading lever thereby to adjust the operating temperature of said device for a predetermined position of said selecting handle, said second portion of said adjusting lever having a threaded section, and a pivot member threadedly arranged on said threaded section and having its periphery seated in a groove formed in said housing member thereby to vary the lever ratio of said adjusting lever for calibrating said device.

References Cited in the file of this patent

UNITED STATES PATENTS

| | | |
|---|---|---|
| 2,393,455 | Beeman | Jan. 22, 1946 |
| 2,651,692 | Slonneger | Sept. 8, 1953 |
| 2,658,121 | Gray et al. | Nov. 3, 1953 |
| 2,666,108 | Brown | Jan. 12, 1954 |
| 2,671,839 | Cox | Mar. 9, 1954 |
| 2,691,084 | Miller | Oct. 5, 1954 |